(12) United States Patent
Ishido

(10) Patent No.: US 8,059,314 B2
(45) Date of Patent: Nov. 15, 2011

(54) IMAGE READING APPARATUS

(75) Inventor: Katsuhiro Ishido, Abiko (JP)

(73) Assignee: Canon Kabushiki Kaisha (JP)

( * ) Notice: Subject to any disclaimer, the term of this patent is extended or adjusted under 35 U.S.C. 154(b) by 983 days.

(21) Appl. No.: 11/858,565

(22) Filed: Sep. 20, 2007

(65) Prior Publication Data

US 2008/0068681 A1    Mar. 20, 2008

(30) Foreign Application Priority Data

Sep. 20, 2006  (JP) ................................ 2006-254473

(51) Int. Cl.
*H04N 1/04* (2006.01)

(52) U.S. Cl. ........ 358/474; 358/498; 358/488; 358/449; 399/472; 399/367; 399/364; 271/3.14; 271/225

(58) Field of Classification Search .................. 358/474, 358/498, 496, 488, 482, 449, 497, 451, 471; 399/367, 374, 47, 17, 82; 271/3.14, 264, 271/225

See application file for complete search history.

(56) References Cited

U.S. PATENT DOCUMENTS

| | | | | |
|---|---|---|---|---|
| 4,908,719 A | * | 3/1990 | Nonoyama | 358/494 |
| 5,073,794 A | * | 12/1991 | Kitagawa et al. | 399/82 |
| 5,267,059 A | * | 11/1993 | Kawabata et al. | 358/498 |
| 5,298,937 A | * | 3/1994 | Telle | 355/23 |
| 5,402,252 A | * | 3/1995 | Kojima | 358/486 |
| 5,463,451 A | * | 10/1995 | Acquaviva et al. | 399/211 |
| 5,652,802 A | | 7/1997 | Graves et al. | |
| 5,663,611 A | | 9/1997 | Seats et al. | |
| 5,687,010 A | * | 11/1997 | Van Tilborg et al. | 358/496 |
| 5,789,729 A | | 8/1998 | Yamamoto | |
| 6,233,068 B1 | * | 5/2001 | Kondo | 358/498 |
| 6,285,853 B1 | * | 9/2001 | Sano | 399/374 |
| 6,333,795 B1 | | 12/2001 | Kaji | |
| 6,672,583 B2 | | 1/2004 | Wei | |
| 6,721,074 B1 | | 4/2004 | Kao | |

(Continued)

FOREIGN PATENT DOCUMENTS

CN    1365230 A    8/2002

(Continued)

OTHER PUBLICATIONS

Office Action issued in corresponding Chinese Patent Application No. 200710153778.6 dated Jun. 12, 2009.

(Continued)

*Primary Examiner* — Negussie Worku
(74) *Attorney, Agent, or Firm* — Rossi, Kimms & McDowell LLP

(57) ABSTRACT

An image reading apparatus which is capable of performing a stable reading operation and matching a sub-scanning magnification with which an original image is scanned, between the front side of an original and the reverse side of the same. A CCD line sensor reads the front side of an original, and a CIS line sensor reads the reverse side of the same. A lead roller is disposed upstream of the CCD line sensor and conveys the original at a first conveying speed. A discharge roller is disposed downstream of the CCD line sensor and conveys the original at a second conveying speed which is higher than the first conveying speed. A CPU controls one main scanning time period of the CCD line sensor after the original is held by the discharge roller, such that the one main scanning time period becomes shorter than before the original is held by the discharge roller.

12 Claims, 8 Drawing Sheets

U.S. PATENT DOCUMENTS

| | | |
|---|---|---|
| 6,795,160 B2 | 9/2004 | Fukusaka |
| 6,961,155 B2 * | 11/2005 | Sakaguchi .................... 358/475 |
| 7,110,148 B2 | 9/2006 | Hasegawa et al. |
| 7,123,390 B2 | 10/2006 | Sato |
| 7,248,378 B2 * | 7/2007 | Shiraishi ..................... 358/1.13 |
| 7,338,042 B2 | 3/2008 | Shimizu |
| 7,468,818 B2 | 12/2008 | Suzuki |
| 7,502,586 B2 * | 3/2009 | Shimizu ........................ 399/367 |
| 7,567,354 B2 | 7/2009 | Shirai |
| 7,688,477 B2 | 3/2010 | Ikeno et al. |
| 7,729,023 B2 | 6/2010 | Morikawa |
| 7,746,523 B2 * | 6/2010 | Kim ............................. 358/498 |
| 7,751,099 B2 | 7/2010 | Mizuhashi et al. |
| 7,782,498 B2 | 8/2010 | Hoshi |
| 7,813,005 B2 | 10/2010 | Arai |
| 7,847,982 B2 | 12/2010 | Mizumukai |
| 2001/0012132 A1 * | 8/2001 | Kaji ............................. 358/474 |
| 2002/0105686 A1 | 8/2002 | Hasegawa et al. |
| 2004/0001187 A1 | 1/2004 | Fukusaka |
| 2004/0012825 A1 | 1/2004 | Tesavis |
| 2004/0057079 A1 * | 3/2004 | Ohsawa ........................ 358/2.1 |
| 2004/0095594 A1 | 5/2004 | Moro |
| 2004/0190089 A1 * | 9/2004 | Tsutsumi ...................... 358/505 |
| 2005/0206968 A1 * | 9/2005 | Sodeura et al. ............... 358/474 |
| 2005/0213167 A1 * | 9/2005 | Shiraishi ....................... 358/474 |
| 2005/0254105 A1 | 11/2005 | Muzzin et al. |
| 2006/0066923 A1 * | 3/2006 | Magata et al. ................ 358/498 |
| 2006/0181747 A1 | 8/2006 | Takata et al. |
| 2006/0232833 A1 * | 10/2006 | Kim .............................. 358/474 |
| 2007/0069451 A1 * | 3/2007 | Iwago et al. ................... 271/186 |
| 2007/0103735 A1 | 5/2007 | Ikeno et al. |
| 2007/0103740 A1 * | 5/2007 | Shingai ......................... 358/498 |
| 2007/0103741 A1 | 5/2007 | Suzuki |
| 2007/0183004 A1 | 8/2007 | Jo |
| 2008/0043294 A1 * | 2/2008 | Su et al. ........................ 358/474 |
| 2009/0244649 A1 * | 10/2009 | Shinkawa ..................... 358/474 |
| 2010/0079827 A1 | 4/2010 | Matsushima |
| 2010/0103477 A1 * | 4/2010 | Lee et al. ...................... 358/474 |
| 2011/0181926 A1 * | 7/2011 | Tokutsu ........................ 358/498 |

FOREIGN PATENT DOCUMENTS

| | | |
|---|---|---|
| CN | 1471039 A | 1/2004 |
| CN | 1822634 A | 8/2006 |
| JP | 7-283906 A | 10/1995 |
| JP | 11-289420 A | 10/1999 |
| JP | 11-289427 A | 10/1999 |
| JP | 2000-188665 A | 7/2000 |
| JP | 2001-285595 A | 10/2001 |
| JP | 2004-187144 A | 7/2004 |

OTHER PUBLICATIONS

Related co-pending U.S. Appl. No. 11/859,444; Katsuhiro Ishido; "Image Scanner and Control Method Thereof", filed Sep. 21, 2007; Spec. pp. 1-39; Figs. 1-12.

* cited by examiner

100

| 100mm | 110mm |
|---|---|
| NORMAL CONVEYING SPEED AREA | 1% INCREASED CONVEYING SPEED AREA |

| 30mm | 180mm |
|---|---|
| NORMAL CONVEYING SPEED AREA | 1% INCREASED CONVEYING SPEED AREA |

IMAGE READING APPARATUS

BACKGROUND OF THE INVENTION

1. Field of the Invention

The present invention relates to an image reading apparatus for a digital copying machine, a facsimile machine, a scanner, or the like, which has a simultaneous double-sided reading mechanism for simultaneously reading both sides of a conveyed original during one-time conveyance, and more particularly to an image reading apparatus having a reading magnification adjusting function.

2. Description of the Related Art

Conventionally, as an image reading apparatus for use in a copying machine or the like, there has been known one which performs so-called "moving original reading" in which originals are conveyed one by one onto an original platen glass by an automatic document feeder, and an original image on each of the originals is read by exposing the original to light by an exposure device fixedly disposed on the conveying path. Further, there has been known another image reading apparatus which is provided with two image readers for enhancement of productivity, and performs "simultaneous double-sided reading" for simultaneously reading both sides of an original during one-time conveyance of the original (see e.g. Japanese Laid-Open Patent Publication (Kokai) No. 2004-187144).

In such an image reading apparatus which is capable of performing reading by the "moving original reading" method, a change in original conveying speed causes an error in original reading magnification. For this reason, it is required to causes an original to be always conveyed through an original reader of the image reading apparatus at a fixed speed.

For example, in a conventional general image reading apparatus, a moving original reading glass included in a reading optical system is disposed in a manner extending along a plane on which an original passes, and a conveying path is formed such that originals pass on the surface of the moving original reading glass.

Further, a plurality of rollers for conveying originals are arranged on the conveying path. More specifically, on an original entering side (conveying upstream side) of the conveying path upstream of the moving original reading glass, there are disposed rollers for stably conveying an original onto the moving original reading glass, and on an original discharging side (conveying downstream side) of the conveying path, there is disposed a discharge roller for discharging an original having been read, by friction between the original and the roller itself.

Now, a description will be given of the influence of a difference between a conveying speed of a lead roller 108 and a lead driven roller 109 of an image reading apparatus, described hereinafter with reference to FIG. 1, and a conveying speed of a lead delivery roller 111 and a lead delivery driven roller 112.

Assuming that the two speeds are set equal to each other such that there is no difference in conveying speed, if a difference in speed occurs e.g. due to a difference in finishing accuracy or wear, an error can occur in original reading magnification. Further, an original can be slackened and float from an original reading position, i.e. a position of a moving original reading glass 116 or 130, which adversely affects resolution or the like (i.e. which causes so-called "out-of-focus").

To solve this problem, a technique described below has been disclosed e.g. in Japanese Laid-Open Patent Publication (Kokai) No. H11-289420.

According to the technique, a conveying speed difference is provided between a conveying roller disposed upstream of an original reader in an original conveying direction and a conveying roller disposed downstream of the original reader. More specifically, the conveying speed of the downstream conveying roller is set to be higher than that of the upstream conveying roller. In a mechanism configured as above, the original is constantly pulled in the conveying direction at the original reader, which prevents the original from being slackened, thereby making it possible to achieve a stable and accurate reading operation.

According to the technique disclosed in Japanese Laid-Open Patent Publication (Kokai) No. H11-289420, however, when an image reading apparatus is equipped with two image readers e.g. for the aforementioned "simultaneous double-sided reading", the following trouble occurs:

Between the moving original reading glass 116 (see FIG. 1) for reading the front side (first side) of an original and the moving original reading glass 130 (see FIG. 1) for reading the reverse side (second side) of the original, there are differences in respect of timing in which the original is caught by the associated roller and timing in which the trailing edge of the original passes to leave the associated roller.

Therefore, when the conveying speed of the downstream conveying roller is set to be higher than that of the upstream conveying roller so as to achieve a stable reading operation, the sub-scanning magnification with which an original is scanned differs between the front side of the original and the rear side of the same.

Specifically, when the conveying speed of the downstream conveying roller is set to be higher than that of the upstream conveying roller as described above, a sub-scanning magnification with which a reverse-side image is scanned becomes smaller than a sub-scanning magnification with which a front-side image is scanned.

SUMMARY OF THE INVENTION

The present invention provides an image reading apparatus which is capable of performing a stable reading operation and matching a sub-scanning magnification with which an original image is scanned, between the front side of an original and the reverse side of the same.

In a first aspect of the present invention, there is provided an image reading apparatus comprising a reader configured to read an original, a first conveyor disposed upstream of the reader in an original conveying direction and configured to convey the original at a first conveying speed, a second conveyor disposed downstream of the reader in the original conveying direction and configured to convey the original at a second conveying speed which is higher than the first conveying speed, and a controller configured to control one main scanning time period of the reader after the original is held by the second conveyor, such that the one main scanning time period becomes shorter than before the original is held by the second conveyor.

According to the image reading apparatus of the present invention, a first conveyor is disposed upstream of a reader for reading an original, in an original conveying direction and is configured to convey the original at a first conveying speed, and a second conveyor is disposed downstream of the reader in the original conveying direction and is configured to convey the original at a second conveying speed which is higher than the first conveying speed. A controller is configured to control one main scanning time period of the reader after the original is held by the second conveyor, such that the one main scanning time period becomes shorter than before the original is held by the second conveyor.

With this configuration, it is possible to perform a stable reading operation and match a sub-scanning magnification with which an original image is scanned, between the front side of an original and the reverse side of the same.

An original holding force of the second conveyor is larger than an original holding force of the first conveyor.

A difference between the second conveying speed and the first conveying speed is set to such a speed difference as to prevent the original from being slackened between the first conveyor and the second conveyor.

The reader can be configured to read a first side of the original, and the image reading apparatus can further comprise a second reader disposed upstream of the second conveyor and configured to read a second side of the original, the controller controlling one main scanning time period of the second reader after the original is held by the second conveyor, such that the one main scanning time period becomes shorter than before the original is held by the second conveyor.

The reader and the second reader can read the respective first and second sides of the original during conveyance of the original by the first conveyor or the second conveyor.

The controller can change the one main scanning time period while the reader is reading the original.

The features and advantages of the invention will become more apparent from the following detailed description taken in conjunction with the accompanying drawings.

BRIEF DESCRIPTION OF THE DRAWINGS

FIGS. 7A and 7B are views showing a second example of an image of originals being conveyed by the image reading apparatus shown in FIG. 1, in which FIG. 7A shows the front side of an original passing through a first reader, and FIG. 7B shows the reverse side of the original through a second reader.

DETAILED DESCRIPTION OF THE PREFERRED EMBODIMENTS

The present invention will now be described in detail with reference to the drawings showing preferred embodiments thereof.

Figure 1:
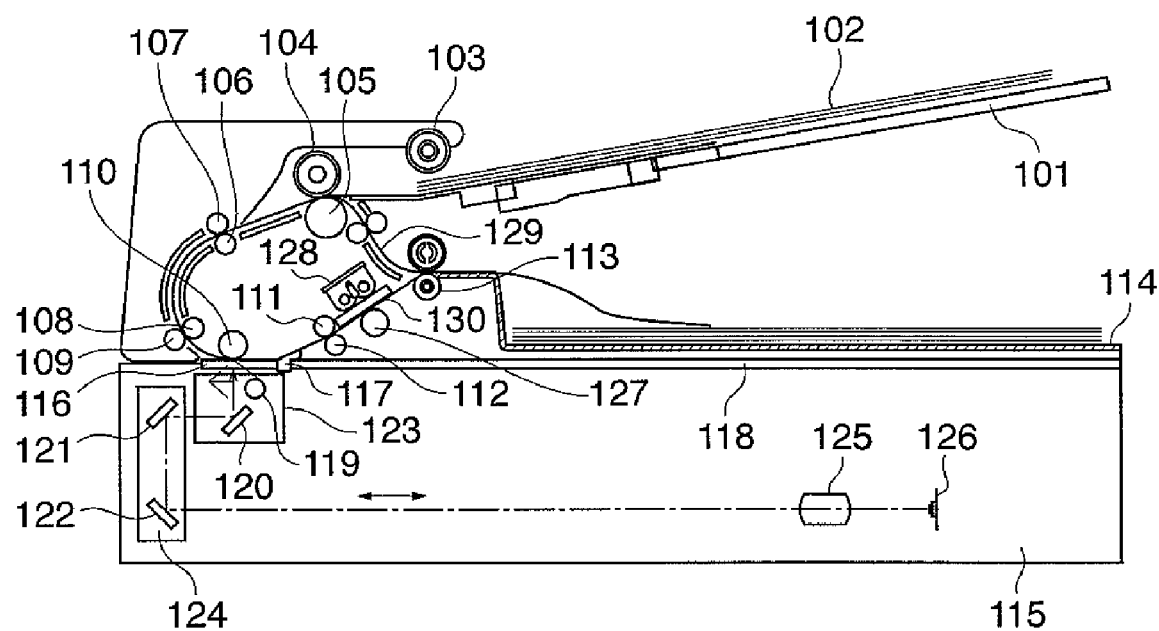
FIG. 1 is a view of an image reading apparatus according to a first embodiment of the present invention.

FIG. 1 is a view of an image reading apparatus according to a first embodiment of the present invention.

As shown in FIG. 1, the image reading apparatus is comprised of an automatic document feeder 100 and an image reading apparatus main unit 115.

Figure 2:
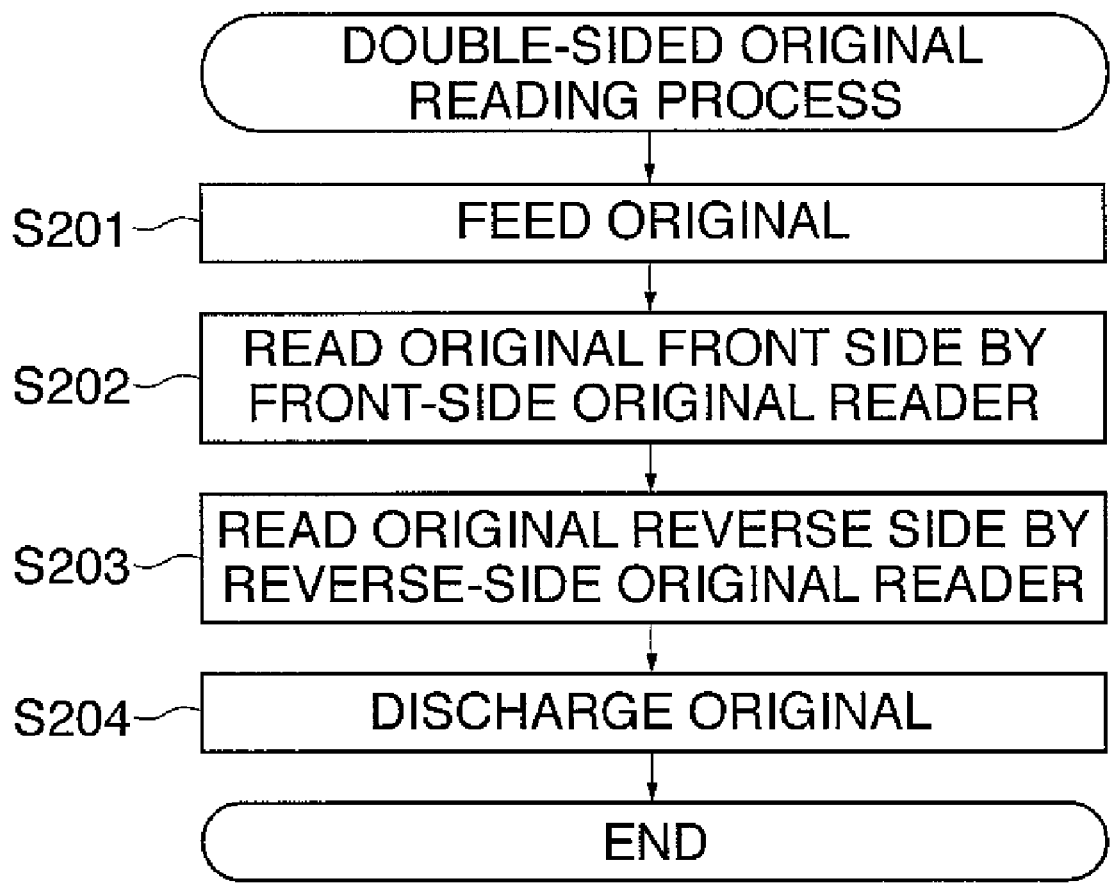
FIG. 2 is a flowchart of a double-sided original reading process executed by the image reading apparatus shown in FIG. 1.

FIG. 2 is a flowchart of a double-sided original reading process executed by the image reading apparatus shown in FIG. 1.

The arrangement of the image reading apparatus will be described together with operations of the flowchart shown in FIG. 2.

Originals 102 are stacked on an original tray 101 of the automatic document feeder 100. A sheet feed roller 103 is disposed above the front end of the original tray 101. The sheet feed roller 103 is connected to the same driving power source as a separating and conveying roller 104 is, and rotates along with rotation of the driving power source to feed each original (step S201).

The sheet feed roller 103 is normally retracted to its home position above the front end of the original tray 101 so as not to interfere with an operation for setting originals on the original tray 101. When a sheet-feeding operation is started, the sheet feed roller 103 comes downward into contact with the upper surface of an original 102. The sheet feed roller 103 is pivotally supported on an arm, not shown, and hence the sheet feed roller 103 can be vertically moved along with swinging motion of the arm.

A separating and conveying driven roller 105 is disposed at a location opposed to the separating and conveying roller 104, and is pressed against the same. The separating and conveying driven roller 105 is formed e.g. of a rubber material having a slightly lower friction than the separating and conveying roller 104. The separating and conveying driven roller 105 and the separating and conveying roller 104 cooperate to separate originals 102 fed by the sheet feed roller 103, one from the others, and feed the originals 102 one by one.

A registration roller 106 and a registration driven roller 107 cooperate to align the leading end of an original 102 fed via the separating part. The rollers 106 and 107 bring the leading end of the separated original 102 into abutment against a nip of the registration roller pair at rest and forms the same into a loop (curved shape) to thereby correct skew of the original 102. Then, a lead roller 108 and a lead driven roller 109 cooperate to convey the original 102 toward a moving original reading glass 116. A platen roller 110 is disposed at a location opposed to the moving original reading glass 116.

A CCD line sensor 126 reads image information from the front side of the original 102 passing over the moving original reading glass 116 (first reader) (step S202). When reading of the front-side image of the original 102 by the CCD line sensor 126 is completed, a lead delivery roller 111 and a lead delivery driven roller 112 cooperate to convey the original 102 toward a CIS line sensor 128.

A jump base 117 is provided for picking up an original 102 from the moving original reading glass 116. A platen roller 127 is disposed at a location opposed to the CIS line sensor 128. The CIS line sensor 128 reads image information from the reverse side of the original 102 passing over a moving original reading glass 130 (second reading unit) (step S203). When reading of the reverse-side image of the original 102 by the CIS line sensor 128 is completed, a discharge roller 113 discharges the original 102 onto a discharge tray 114 (step S204).

The image reading apparatus main unit 115 includes a lamp 119 for irradiating light onto a surface of an original 102 to be scanned, and mirrors 120, 121, and 122 for guiding reflected light from the original 102 to a lens 125 and the CCD line sensor 126. The lamp 119 and the mirror 120 are attached to a first mirror base 123. On the other hand, the mirrors 121 and 122 are attached to a second mirror base 124.

The mirror bases 123 and 124 are connected to a drive motor (not shown) by wires (not shown), and are driven by the drive motor to move in parallel with an original platen glass 118. The reflected light from the original 102 is guided to the lens 125 via the mirrors 120, 121, and 122, and is caused to form an image on the light-receiving part of the CCD line sensor 126 by the lens 125.

The CCD line sensor 126 photoelectrically converts the reflected light forming the image by a light-receiving element and outputs an electric signal corresponding to the amount of received light. Similarly, the CIS line sensor 128 photoelectrically converts reflected light from the original 102 by a light-receiving element, and outputs an electric signal corresponding to the amount of received light.

The image reading apparatus constructed as above has a stationary original reading mode for reading an original 102 placed on the original platen glass 118 while moving the first and second mirror bases 123 and 124 in the sub scanning direction (in directions indicated by a double-headed arrow in FIG. 1).

Further, the image reading apparatus also has a moving original reading mode for reading an original 102 on the moving original reading glasses 116 and 130 while conveying the original 102 by the automatic document feeder 100 with the first mirror base 123 and the second mirror base 124 held at rest. Original reading can be performed in these two modes.

Figure 3:
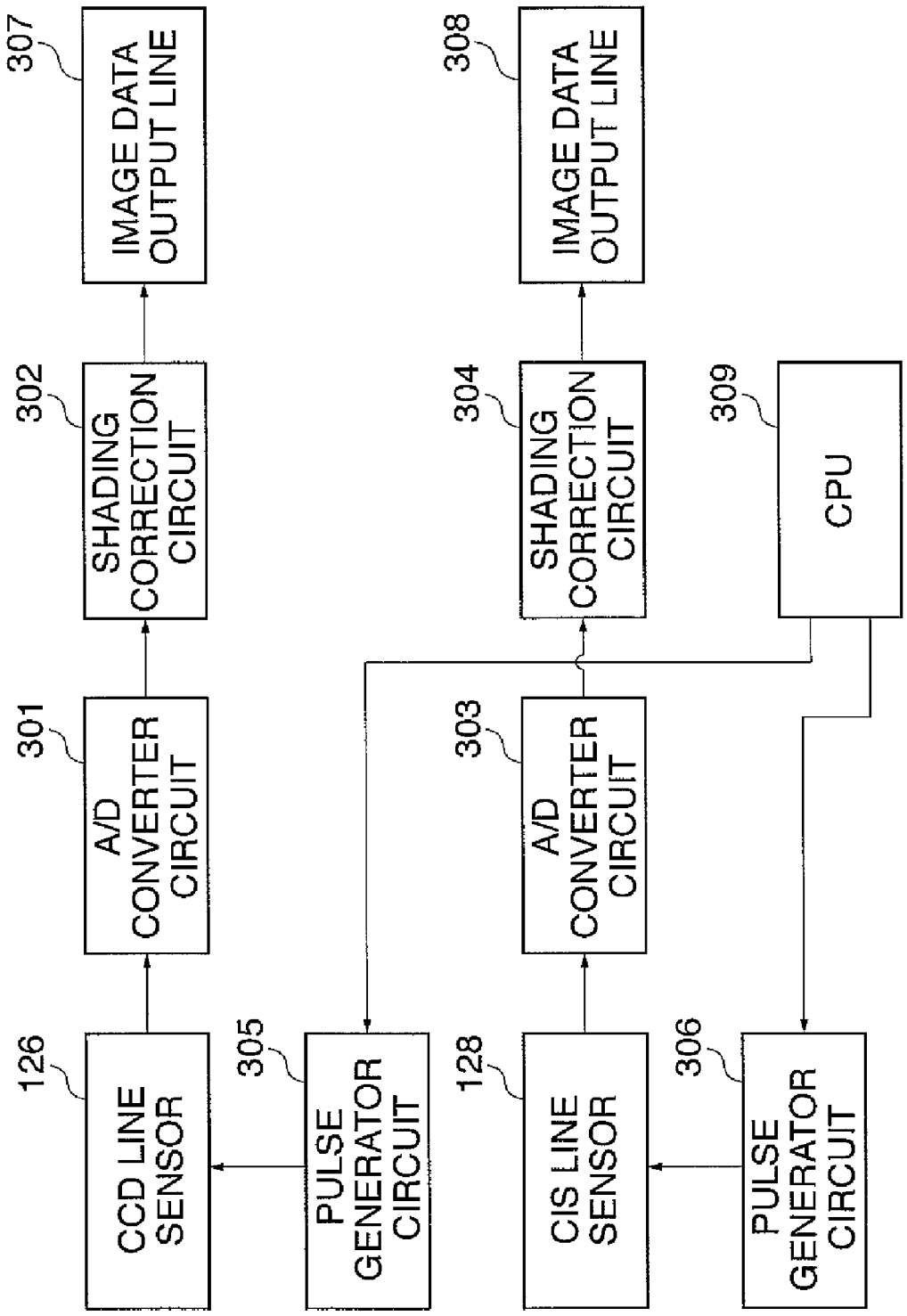
FIG. 3 is a block diagram of the image reading apparatus according to the first embodiment.

FIG. 3 is a block diagram of the image reading apparatus according to the first embodiment.

As shown in FIG. 3, the image reading apparatus includes a pulse generator circuit 305 that drives the CCD line sensor 126 for scanning the front side of an original, and an A/D converter circuit 301 that converts an analog signal output from the CCD line sensor 126 into a digital signal.

Further, the image reading apparatus includes a shading correction circuit 302 that performs shading correction on image data converted into digital values by the A/D converter circuit 301, and an image data output line 307 for outputting the image data output from the CCD line sensor 126 and subjected to the shading correction, to an external apparatus.

The image reading apparatus also includes a pulse generator circuit 306 that drives the CIS line sensor 128 for scanning the reverse side of an original and an A/D converter circuit 303 that converts an analog signal output from the CIS line sensor 128 into a digital signal.

Furthermore, the image reading apparatus includes a shading correction circuit 304 that performs shading correction on image data converted into digital values by the A/D converter circuit 303, and an image data output line 308 for outputting the image data output from the CIS line sensor 128 and subjected to the shading correction to the external apparatus. The image reading apparatus is provided with a CPU 309 that controls the overall operation of the image reading apparatus.

The pulse generator circuit 305 (306) is configured to be capable of changing a driving condition for driving the CCD line sensor 126 (the CIS line sensor 128), such as a scanning time period required for a one-line main scanning operation, based on settings configured by the CPU 309.

Figure 4:
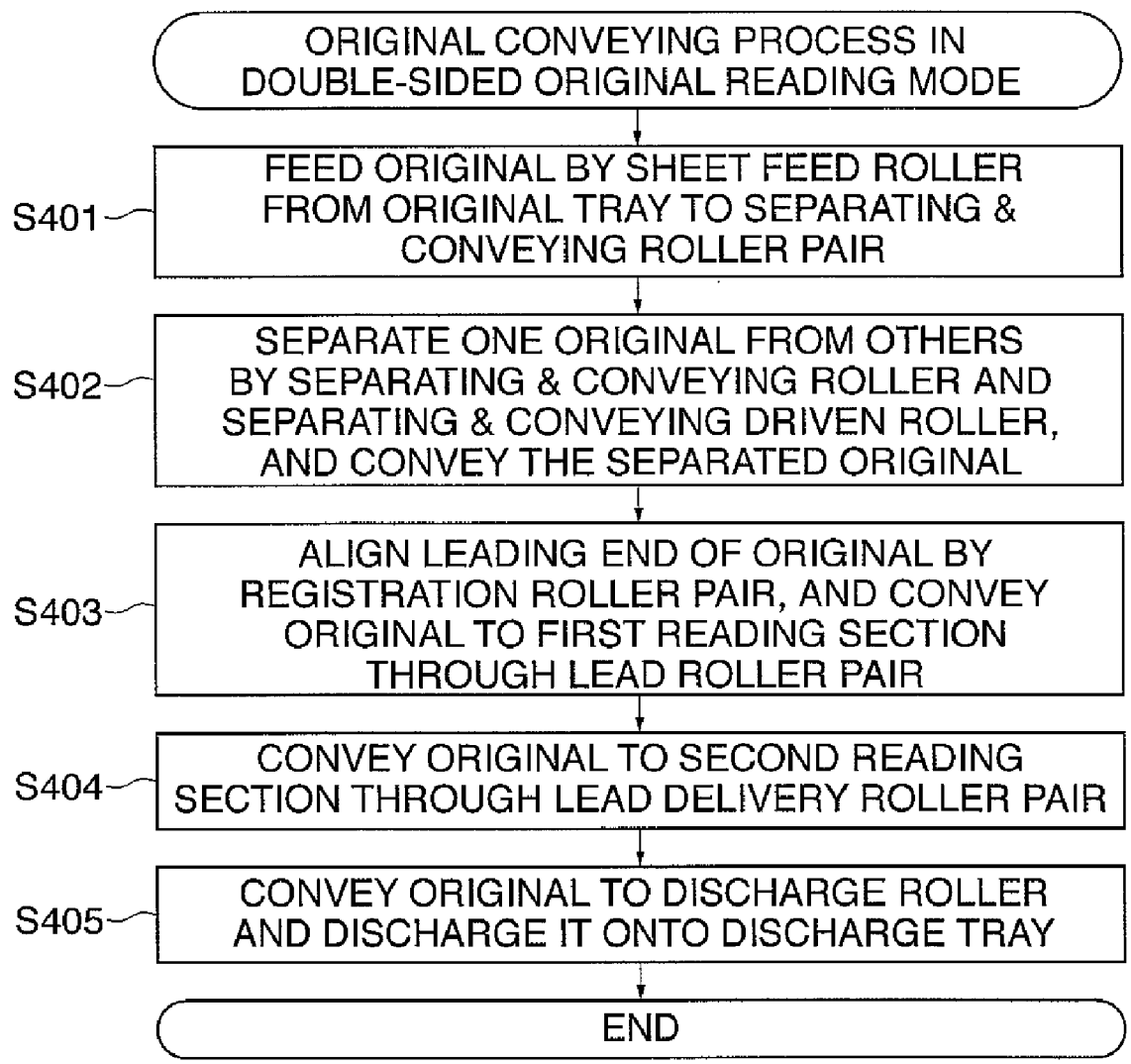
FIG. 4 is a flowchart of an original conveying process in a double-sided original reading mode, which is executed by the image reading apparatus.

FIG. 4 is a flowchart of an original conveying process in a double-sided original reading mode, which is executed by the image reading apparatus in FIG. 1.

Referring to FIG. 4, the originals 102 stacked on the original tray 101 are sequentially fed to the separating and conveying roller pair by the sheet feed roller 103 in order from the top (step S401). If a plurality of originals are fed in a stack, the separating and conveying roller 104 and the separating and conveying driven roller 105 cooperate to separate and convey each single original from the stack (step S402).

Each separate original has its leading end aligned by the registration roller pair disposed downstream of the separating and conveying roller pair, and then is conveyed to the first reader (front-side reader) through the lead roller pair (step S403). Then, the original 102 is guided to a second reader (reverse-side reader) through the lead delivery roller pair (step S404), further conveyed to the discharge roller 113, and discharged onto the discharge tray 114 (step S405), followed by terminating the present process.

Figure 5:
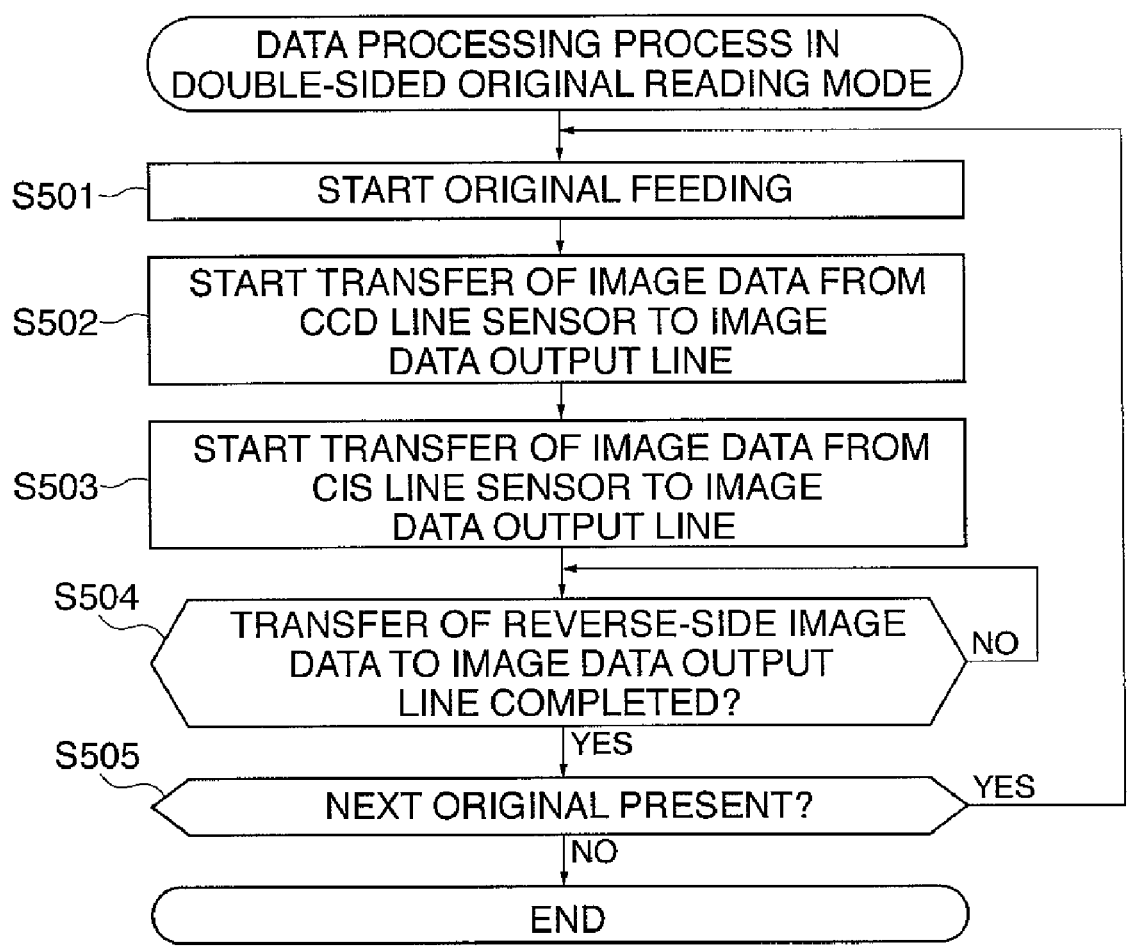
FIG. 5 is a flowchart of a data processing process in the double-sided original reading mode, which is executed by the image reading apparatus.

FIG. 5 is a flowchart of a data processing process in the double-sided original reading mode, which is executed by the image reading apparatus in FIG. 3.

The present process is executed by the CPU 309.

Referring to FIG. 5, first, original feeding is started (step S501), and when an original reaches the first reader, transfer of image data from the CCD line sensor 126 to the image data output line 307 is started (step S502).

Then, when the original reaches the second reader, transfer of image data from the CIS line sensor 128 to the image data output line 308 is started (step S503). When completion of the transfer of the image data from the CIS line sensor 128 to the image data output line 308 is detected (YES to a step S504), if a next original is present (YES to a step S505), the process proceeds to an operation for reading the next original. If no original is present for the next original reading operation (NO to the step S504), the double-sided original reading operation is terminated.

Next, a description will be given of an original conveying speed and a driving speed of the CCD line sensor 126.

Considering a driving speed of an image reading apparatus which is capable of reading sixty A4-size originals per minute, it is required to set the driving speed such that the image reading apparatus can read one original in one second. When an original is set with the transverse direction thereof in parallel relation to a conveying direction, the sub-scanning length of the A4-size original is 210 mm. Assuming that an original conveyance interval (sheet interval) is 40 mm, it is required to drive the CCD line sensor 126 at a speed fast enough to scan a length of 250 mm per second in the sub scanning direction.

Considering a case where an original is read at a resolution of 600 dpi, a one-line main scanning time period (i.e. a scanning time period required for reading one main scanning line) under the above conditions can be determined by the following equation:

$$\text{one-line main scanning time period} = 1\ \text{sec}/(250\ \text{mm}/(25.4\ \text{mm}/600))$$

As is understood from the above equation, it is required to drive the CCD line sensor 126 at a speed equivalent to one-line main scanning time period=169 μsec. This applies to the CIS line sensor 128 for scanning the reverse side of the original.

As for the conveying speed of the original-conveying rollers, assuming that the CCD line sensor 126 is driven under the above conditions, a sub-scanning magnification becomes equal to 100% by conveying an original at a conveying speed of 250 mm per second, and therefore it is required to convey the rollers at a speed of 250 mm/sec.

Figure 6:
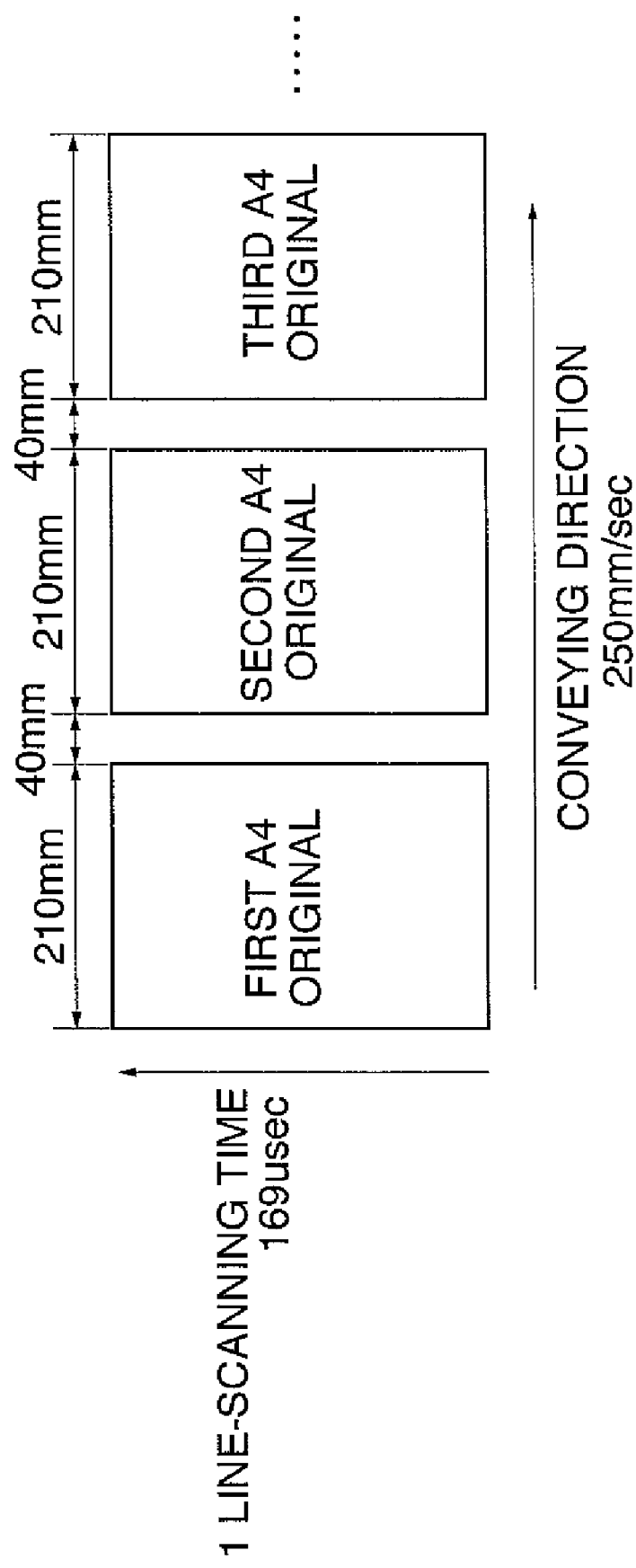
FIG. 6 is a view showing a first example of an image of originals being conveyed by the image reading apparatus shown in FIG. 1.

FIG. 6 is a view showing a first example of an image of originals being conveyed by the image reading apparatus shown in FIG. 1.

Now, to prevent an original from being slackened or loosened when a difference in speed occurs between the lead roller 108 and the lead delivery roller 111, and the discharge roller 113 due to a difference in finishing accuracy or wear, the discharge roller 113 is driven by increasing the conveying speed thereof by 1% with respect to that of the lead roller 108 and the lead delivery roller 111, so as to pull the original being conveyed. In other words, the difference in speed between the conveying speed (first conveying speed) of the lead roller 108 and the lead delivery roller 111 and the conveying speed (second conveying speed) of the discharge roller 113 is set to a value which makes it possible to prevent the original from being slackened between the lead delivery roller 111 and the discharge roller 113. The original nipping (holding) force of the discharge roller 113 is set to be larger than those of the lead roller 108 and the lead delivery roller 111. Alternatively, the lead roller pair and the lead delivery roller pair may be each configured such that one of the driving roller thereof and the driven roller thereof is moved in a direction away from the other during a time period over which the original is being pulled by the discharge roller 113, so as to reduce the frictional force or the holding force of each of the lead roller 108 and the lead delivery roller 111.

In this case, when an original 102 is caught by the discharge roller 113, the conveying speed at which the original 102 is conveyed is increased by 1%, so that the sub-scanning magnification with which the front side of the original is scanned and the sub-scanning magnification with which the reverse side of the original differ is scanned are made different from each other due to the positional relationship between the discharge roller 113 and the first and second readers.

Now, let it be assumed that the distance between the first reader and the discharge roller 113 is set to 100 mm, and the distance between the second reader and the discharge roller 113 is set to 30 mm. Considering a case of reading an A4-size original with this arrangement, the first reader reads a leading 100 mm portion of the original 102 at a normal speed, and the remaining 110 mm portion at a speed increased by 1%.

Figure 7A:
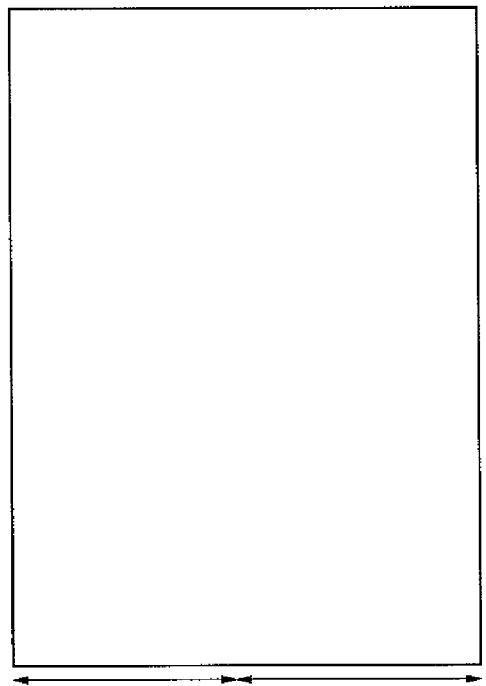
Figure 7B:
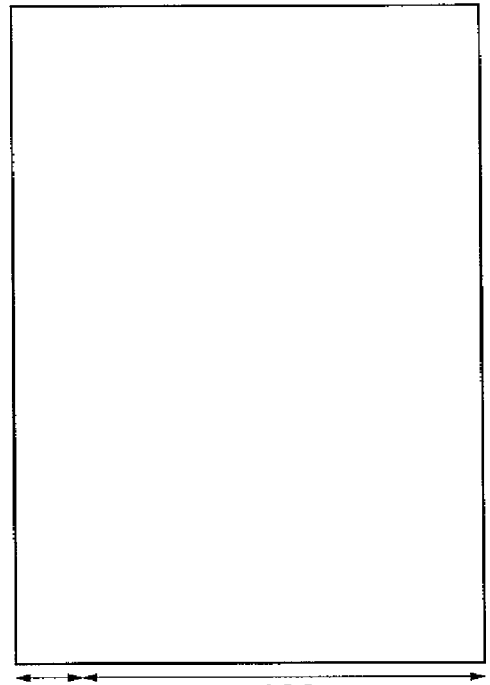

The second reader reads a leading 30 mm portion of the original 102 at the normal speed, and the remaining 180 mm portion at the speed increased by 1% FIGS. 7A and 7B illustrate an example of the case of reading an A4-size original. FIG. 7A shows the front side of the original passing through the first reader, and FIG. 7B shows the reverse side of the original passing through the second reader.

If the original is read in this state, image data acquired by scanning by the front-side reader (first reader) will have the following size:

front-side sub-scanned size=100 mm (normal speed area)+110 mm/1.01 (increased speed area)

front-side sub-scanned size≈208.9 mm

On the other hand, image data acquired by scanning by the reverse-side reader (second reader) will have the following size:

reverse-side sub-scanned size=30 mm (normal speed area)+180 mm/1.01 (increased speed area)

reverse-side sub-scanned size≈208.2 mm

Thus, even when an A4-size original originally having a sub-scanning length of 210 mm is scanned, the scanned size becomes smaller than the actual sub-scanning length.

It is possible to adjust the front-side sub-scanned size to 210 mm by adjusting (reducing) the driving speed of the lead roller 108 and the lead delivery roller 111, which determines the conveying speed at which the original is conveyed to the discharge roller 113, i.e. the normal conveying speed of 250 mm/sec to the following speed:

front-side adjusted conveying speed≈250 mm/sec× 208.9 mm/210 mm front-side adjusted conveying speed≈248.69 mm/sec However, even if the normal conveying speed is adjusted to the above speed, the reverse-side sub-scanned size becomes as shown below, and hence it is impossible to adjust the reverse-side scanning size to 210 mm:

reverse-side sub-scanned size after front-side adjustment=210 mm/208.9 mm×208.2 mm reverse-side sub-scanned size after front-side adjustment=209.29 mm To solve this problem, according to the present embodiment, first, the sub-scanning magnification for the front-side image to be scanned is adjusted by adjusting the normal conveying speed, and then the sub-scanning magnification for the reverse-side image to be scanned is adjusted by adjusting the one-line main scanning time period of the CIS line sensor 128.

For example, after the adjustment of the normal conveying speed, the magnification left to be adjusted is as follows:

209.29 mm/210 mm=99.66%

Therefore, it suffices to shorten the one-line main scanning time period of the CIS line sensor 128 (i.e. increase the driving speed of the CIS line sensor 128) by an extent corresponding to this adjustment as follows:

one-line main scanning time period after reverse-side adjustment=169 μsec×0.9966 one-line main scanning time period after reverse-side adjustment=168.4254 μsec.

Thus, the CPU 309 configures the settings of the pulse generator circuit 306 such that the one-line main scanning time period of the CIS line sensor 128 becomes equal to 168.4254 μsec.

The front-side magnification adjustment and the reverse-side magnification adjustment, described above, are performed on the A4-size original by way of example, and hence if an original of another size is to be read, it is required to change setting values according to the size of the original. This is because the ratio between an area to be read at the normal speed and an area to be read at an increased speed changes.

Therefore, the CPU 309 configures a conveying speed depending on the size of an original set by a user for reading, and sets a reverse-side one-line main scanning time period to the pulse generator circuit 306.

Thus, even when the conveying speed of the rollers on the conveying downstream side is driven in a manner pulling each original, it is possible to perform a simultaneous double-sided reading operation with accurate front-side and reverse-side sub-scanning magnification adjustments.

Next, a second embodiment of the present invention will be described. In the second embodiment, a description will be given of an image reading operation which is performed with the same arrangement as that of the first embodiment but under different control for scanning magnification adjustment.

In the first embodiment, first, the sub-scanning magnification for the front-side image to be scanned is adjusted by adjusting the normal conveying speed, and then the sub-scanning magnification for the reverse-side image to be scanned is adjusted by adjusting the one-line main scanning time period of the CIS line sensor 128.

Figure 8:
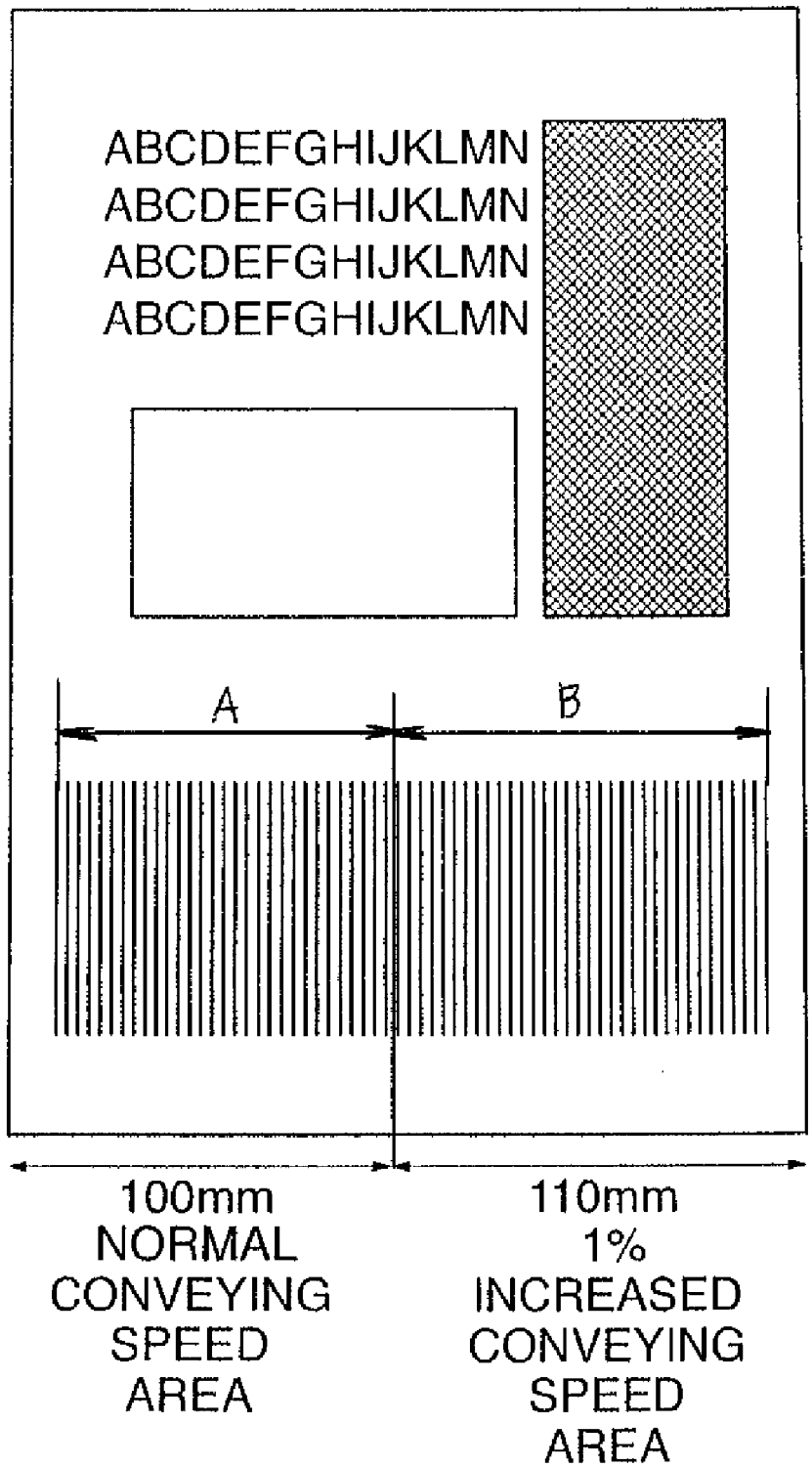
FIG. 8 is a view showing a third example of an image of an original being conveyed by the image reading apparatus shown in FIG. 1.

With this configuration, it is possible to adjust the sub-scanning magnification for an entire A4-size original. When attention is paid to portions of a scanned original image, however, when the original 102 is caught by the discharge roller, the conveying speed at which the original is conveyed is increased by 1%, which causes a difference in magnification between the portions of the scanned original image. For example, in a case where an original having lines printed thereon at equal spaced intervals, as shown in FIG. 8, is scanned, the width of lines (in a portion B in FIG. 8) scanned after the original is caught by the discharge roller 113 is reduced by 1% with respect to that of lines (in a portion A in FIG. 8) scanned before the original is caught by the discharge roller 113.

To eliminate this inconvenience, in the present embodiment, a time period after the start of feeding of an original 102 is counted so that timing in which the original is caught by the discharge roller 113 can be detected by the CPU 309. Then, the CPU 309 configures settings of each of the pulse generator circuits 305 and 306, for reducing the one-line main scanning time period of the associated line sensor by 1% (i.e. setting for increasing the driving speed for the CCD line sensor 126 and the CIS line sensor 128 by 1%) in timing synchronous with catching of the original 102 by the discharge roller 113. Specifically, values calculated by the following equation are set.

one-line main scanning time period=169μsec/1.01 one-line main scanning time period=167.327 μsec.

Thus, the pulse generator circuits 305 and 306 are configured such that the original 102 is scanned with the one-line main scanning time period set to 169 μsec until the original is caught by the discharge roller 113. Then, the settings of the pulse generator circuits 305 and 306 are changed in timing synchronous with catching of the original 102 by the discharge roller 113 such that scanning is performed with the one-line main scanning time period set to 167.327 μsec.

The present image reading apparatus is controlled, as described above, whereby even when the roller on the downstream side with respect to the conveying direction is driven with an increased conveying speed so as to pull an original, it is possible to perform a simultaneous double-sided reading operation with accurate front-side and reverse-side sub-scanning magnification adjustments. Further, it is possible to adjust the sub-scanning magnification with a simple configuration that requires no original size-dependent change of configuration values.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-254473 filed Sep. 20, 2006, which is hereby incorporated by reference herein in its entirety.

What is claimed is:

1. An image reading apparatus comprising:
   a line sensor configured to read an original;
   a first conveyor disposed upstream of a reading position of said line sensor in an original conveying direction and configured to convey the original at a first conveying speed;
   a second conveyor disposed downstream of the reading position of said line sensor in the original conveying direction and configured to convey the original at a second conveying speed which is higher than the first conveying speed; and
   a controller configured to control a speed of a driving pulse for said line sensor in accordance with a size of the original to be read by said line sensor,
   wherein a difference between the second conveying speed and the first conveying speed is set to such a speed difference as to prevent the original from being slackened between said first conveyor and said second conveyor.

2. An image reading apparatus as claimed in claim 1, wherein an original holding force of said second conveyor is larger than an original holding force of said first conveyor.

3. An image reading apparatus as claimed in claim 1, wherein said controller sets the speed of the driving pulse for said line sensor corresponding to the size of the original to be read by said line sensor.

4. An image reading apparatus comprising:
   a first line sensor configured to read one side of an original;
   a second line sensor configured to read a side opposite the one side of the original;
   a first conveyor disposed upstream of a reading position of said line sensor in an original conveying direction and configured to convey the original at a first conveying speed;
   a second conveyor disposed downstream of the reading position of said first line sensor in the original conveying direction and configured to convey the original at a second conveying speed which is higher than the first conveying speed; and
   a controller configured to control a speed of a driving pulse for said first line sensor in accordance with a size of the original to be read by said line sensor,
   wherein a reading position of said second line sensor is disposed upstream of said reading position of said first line sensor in the original conveying direction.

5. An image reading apparatus as claimed in claim 4, wherein said line sensor and said second line sensor read the respective opposing sides of the original during conveyance of the original by said first conveyor or said second conveyor.

6. An image reading apparatus as claimed in claim 5, wherein said controller controls the first and second conveying speed of said first and second conveyor in accordance with a size of the original to be read by said line sensor.

7. An image reading apparatus as claimed in claim 6, wherein said controller adjusts a sub-scanning magnification of image read by said second line sensor to the size of the original by controlling the first and second conveying speed and adjusts a sub-scanning magnification of image read by said line sensor to the size of the original by controlling the speed of the driving pulse for said line sensor.

8. An image reading apparatus comprising:
   a conveying path configured to convey an original;
   a first line sensor configured to read, at a first reading position based on a first driving pulse, one side of the original being conveyed along said conveying path;
   a second line sensor configured to read, at a second reading position based on a second driving pulse, another side of the original being conveyed along said conveying path;
   a first conveyor disposed between the first reading position and the second reading position in said conveying path and configured to convey the original at a first conveying speed; and
   a second conveyor disposed downstream of the second reading position in said conveying path and configured to convey the original at a second conveying speed which is higher than the first conveying speed, wherein the second driving pulse of said second line sensor is shorter than the first driving pulse of said first line sensor.

9. An image reading apparatus as claimed in claim 8, wherein an original holding force of said second conveyor is larger than an original holding force of said first conveyor.

10. An image reading apparatus as claimed in claim 8, wherein the first conveying speed of said first conveyor is controlled so as to adjust a first sub scanning direction size of an image data acquired by said first line sensor reading the one side of the original based on the first driving pulse, to a predetermined size.

11. An image reading apparatus as claimed in claim 10, wherein said second line sensor is controlled so as to adjust a scanning time period for one main scanning of said second line sensor, and thereby adjust a second sub scanning direction size of an image data acquired by said second line sensor reading the another side of the original based on the second driving pulse, to the first sub scanning direction size.

12. An image reading apparatus comprising:
a conveying path configured to convey an original;
a line sensor configured to read, based on a driving pulse, the original being conveyed along said conveying path;
a first conveyor disposed upstream of a reading position of said line sensor in said conveying path and configured to convey the original at a first conveying speed;
a second conveyor disposed downstream of the reading position of said line sensor in said conveying path and configured to convey the original at a second conveying speed which is higher than the first conveying speed; and
a controller configured to change a speed of the driving pulse according to timing in which the original being conveyed is caught by said second conveyor,
wherein said controller changes the speed of the driving pulse such that a speed of the driving pulse after being caught of the original being conveyed by said second conveyor is higher than before being caught of the original being conveyed by said second conveyor.

* * * * *